United States Patent
Gramer et al.

[11] 3,965,887
[45] June 29, 1976

[54] METHOD OF HEATING A LIQUID AND SOLAR HEATING PANEL THEREFOR

[76] Inventors: Eben J. Gramer, 98 Cabrini Blvd., Golden, Colo. 80401; Melvin O. Johnson, 6488 Southwood Drive, Littleton, Colo. 80121

[22] Filed: Oct. 7, 1974

[21] Appl. No.: 512,701

[52] U.S. Cl. .............................. 126/271; 165/170
[51] Int. Cl.² ............................................. F24J 3/02
[58] Field of Search ............ 126/270, 271; 237/1 A; 165/170

[56] References Cited
UNITED STATES PATENTS

| | | | |
|---|---|---|---|
| 3,146,774 | 9/1964 | Yellott | 126/271 |
| 3,174,915 | 3/1965 | Edlin | 126/271 |
| 3,239,000 | 3/1966 | Meagher | 126/271 |
| 3,399,664 | 9/1968 | Suhay | 126/271 |
| 3,799,145 | 3/1974 | Butterfield | 126/271 |

*Primary Examiner*—Kenneth W. Sprague
*Assistant Examiner*—James C. Yeung
*Attorney, Agent, or Firm*—Burton, Crandell and Polumbus

[57] ABSTRACT

A method of heating a liquid and a solar heating panel therefor is disclosed. The method comprises forming one or more obstruction free, longitudinally extending liquid passageways one side of each passageway being formed from a metallic material whereon the outer surface of said metallic material contains a solar radiation heat absorbing coating and each passageway has a width to depth ratio varying between approximately 6.5 to 15 and a mean hydraulic radius varying between approximately 0.018 to 0.027, exposing the solar radiation heat absorbing coating to solar radiation energy, and heating a liquid by passing said liquid through said passageway and simultaneously maintaining a substantially constant cross-sectional area flow path through said passageway. By such means the liquid is accelerated as same flows from one end of said passageway to the other end. The liquid is passed through said passageway while maintaining a laminar or non-turbulent flow therethrough. The width to depth ratio preferably varies between approximately 9 to 13.5 and good results have been obtained where same is equal to approximately 10. The mean hydraulic radius preferably varies between approximately 0.018 to 0.023 and good results have been obtained where same equals approximately 0.023. The solar heating panel comprises a base member having a liquid impervious upper surface, a rigid solar heat absorbing member formed from metal and mounted upon said base member, an inverted cup shaped member formed from a transparent material secured to said base member, an elastic adhesive means for securing said solar heat absorbing member to said liquid impervious upper surface, said adhesive means having flat bonding characteristics over the environmental temperature range in which said panel is to be used whereby thermal expansion of said liquid impervious upper surface relative to thermal expansion of said solar heat absorbing member occurs while maintaining a general planarity of the upper surface of the solar heat absorbing member. The inverted cup shaped member permits solar radiation to pass therethrough and impinge upon the solar radiation heat absorbing coating contained on said solar heat absorbing member for all angles of solar radiation impingement from a direction normal to the upper surface of the solar heat absorbing member plus or minus less than 90°. Said base member includes a plurality of spaced apart fluid supply recesses and preferably a fluid return recess all formed in the liquid impervious upper surface thereof, and a plurality of spaced apart strips, said strips being disposed intermediate each of said recesses and adjacent to the outer side of the outwardly disposed recesses. Said strips are preferably configured whereby said metallic material is spaced above a major portion of the plan surface area of said strip by a predetermined distance.

14 Claims, 10 Drawing Figures

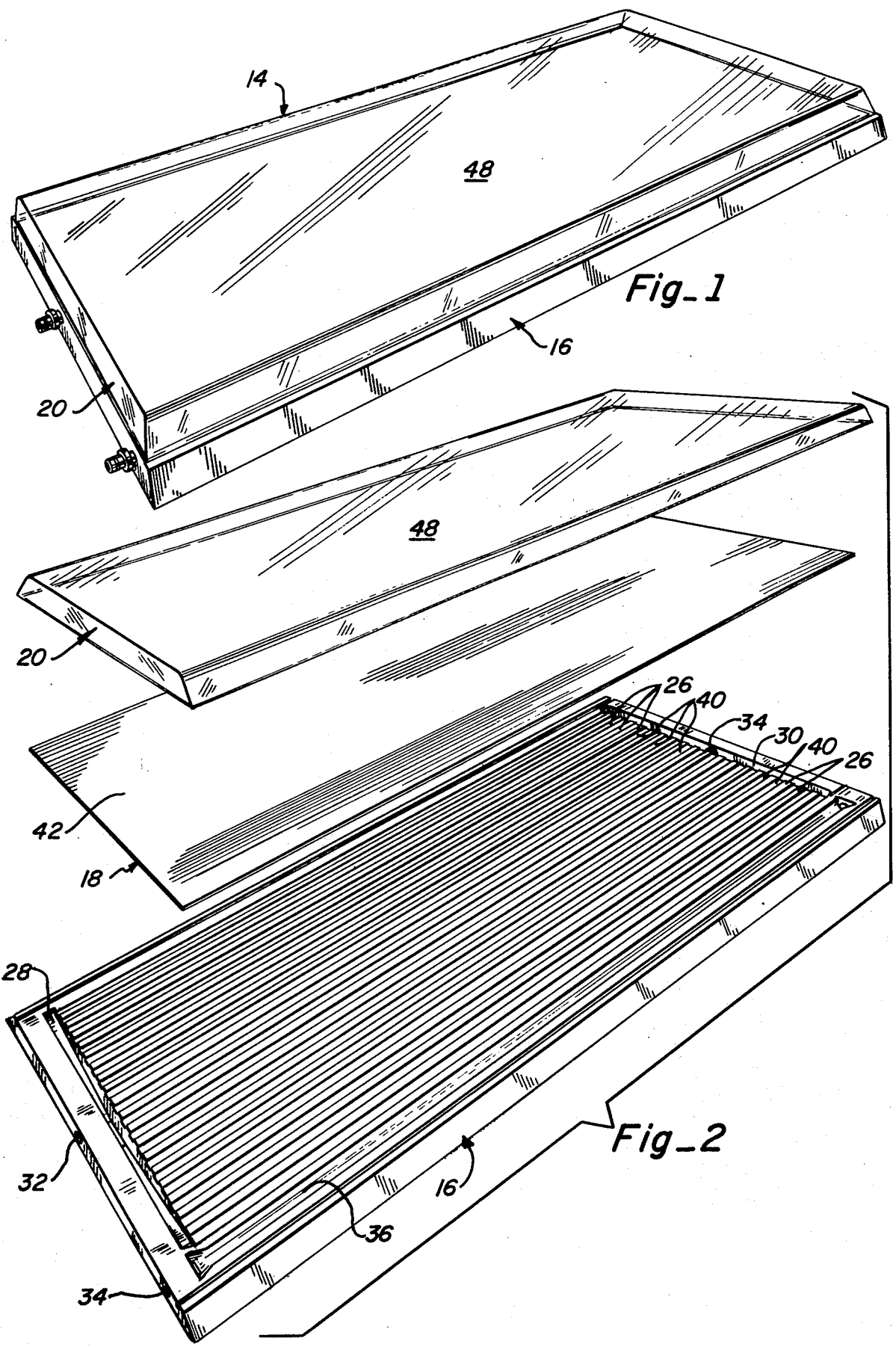

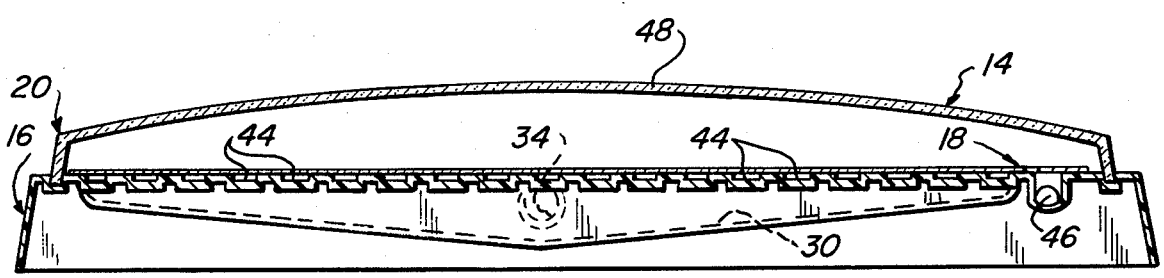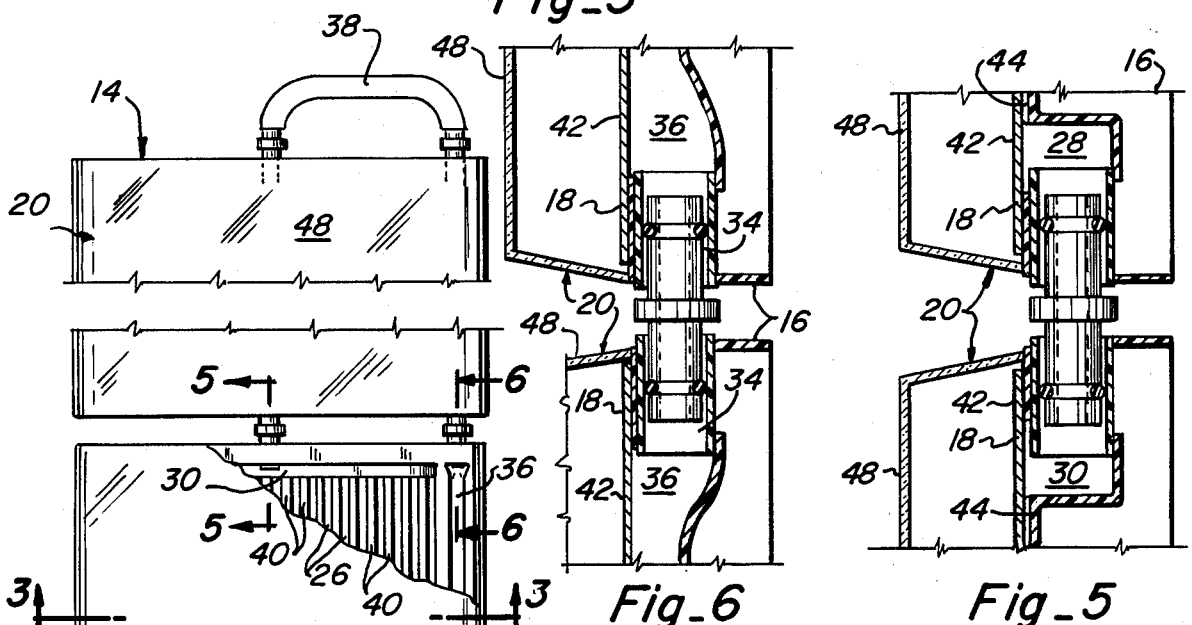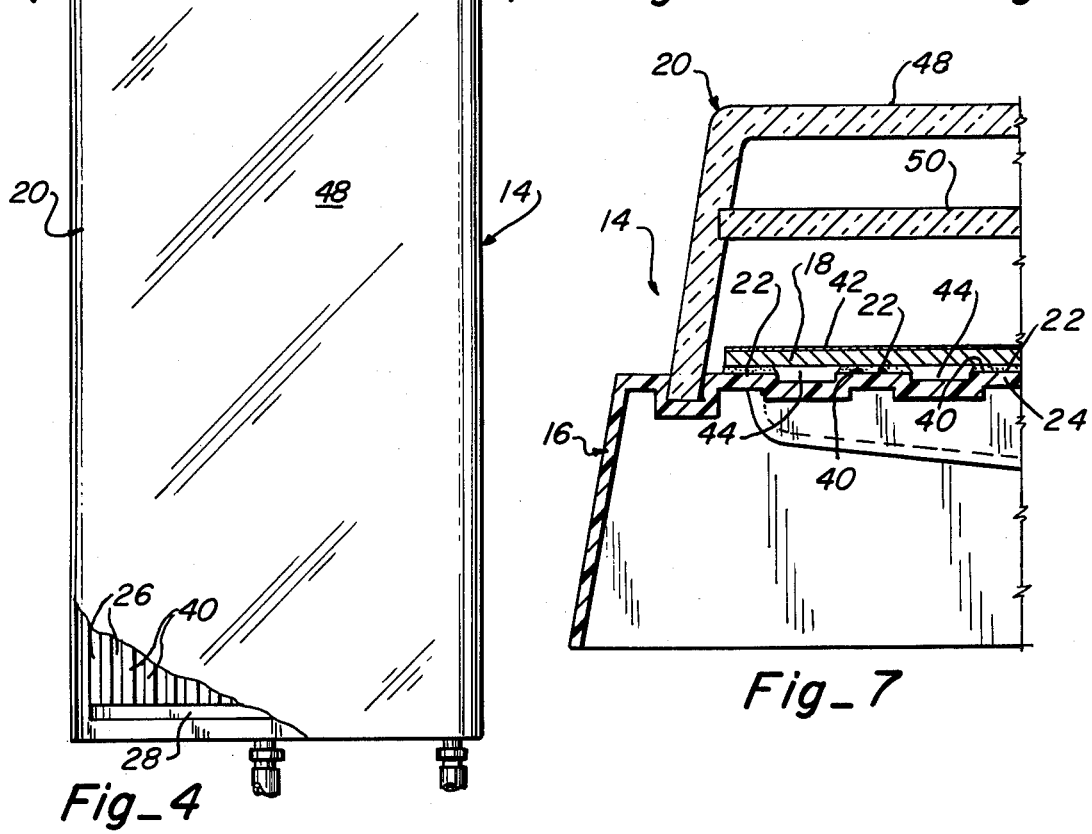

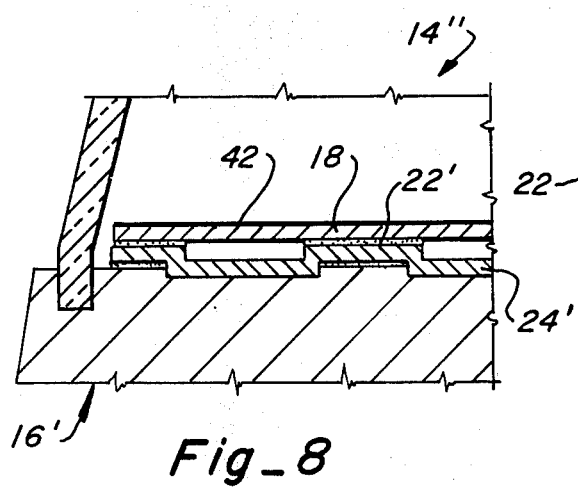
Fig_8
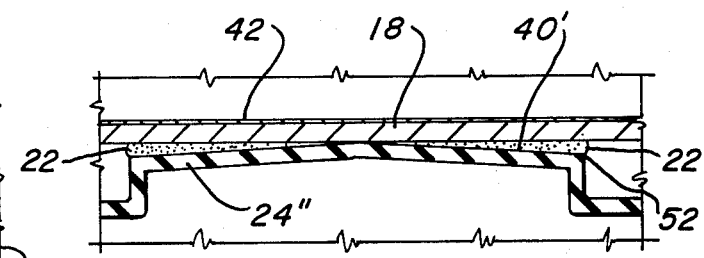
Fig_9
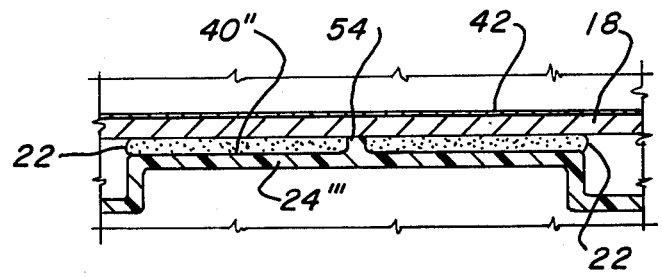
Fig_10

METHOD OF HEATING A LIQUID AND SOLAR HEATING PANEL THEREFOR

FIELD OF THE INVENTION

This invention relates to a method and panel for use in transferring heat to or from a liquid, said liquid being heated by solar radiation energy.

BACKGROUND OF THE INVENTION

Heretofore numerous methods and apparatuses for heating a liquid through utilization of solar radiation waves have been proposed and constructed. Each of these methods and apparatuses have, however, proved to be disadvantageous for one or more reasons. Some prior art methods and apparatuses have been ineffective due to the type of materials used. Other prior art methods and apparatuses have been ineffective due to the configuration of the fluid supply channels or passageways involved. Still other prior art apparatuses have been ineffective due to the overall configuration thereof. Other prior art apparatuses have been ineffective due to the small quantity of liquid that can be processed therethrough. Additionally, each of the prior art methods and apparatuses has been relatively expensive and, in some cases, difficult to maintain adequately for long operating periods. Illustrative prior art methods and apparatuses are shown in U.S. Pat. Nos. 679,451, 1,250,260, 2,358,476, 2,553,302, 3,076,450, 3,077,190, 3,145,707, 3,190,816 and 3,387,602.

The method and solar heating panel of this invention overcomes the disadvantages referred to above by providing a panel which is inexpensive to manufacture, has a relatively long operating life and yet which is highly efficient in heating liquid through the utilization of solar radiation energy.

SUMMARY OF THE INVENTION

The solar heating panel of this invention comprises a base member formed from an insulating material and having a liquid impervious upper surface, a rigid solar heat absorbing member formed from a metal and containing a black, solar radiation absorbing coating on the upper surface thereof, an inverted cup shaped member formed from a transparent material and secured to said base member, an elastic adhesive means for securing said solar heat absorbing member to said liquid impervious upper surface, said adhesive means having flat bonding characteristics (i.e., the strength of the bond remains essentially unchanged) over the environmental temperature range in which said panel will be used whereby thermal expansion of said liquid impervious upper surface relative to thermal expansion of said solar heat absorbing member takes place without adversely affecting the general planarity of the upper surface of said solar heat absorbing member. The base member includes a plurality of spaced apart fluid supply recesses formed in the liquid impervious upper surface thereof. The base member also includes inlet and outlet manifolds formed in the liquid impervious upper surface each of which is disposed in fluid communication with each of said recesses. The base member also includes inlet and outlet ports disposed, respectively, in fluid communication with the inlet manifold and the outlet manifold. The base member preferably includes a fluid return recess formed in the upper surface thereof along one side thereof. The base member also includes a plurality of spaced apart strips formed on the liquid impervious upper surface, said strips being disposed intermediate each of said recesses and adjacent to the outer side of the outwardly disposed recesses. The solar heat absorbing member cooperates with the recesses of said base member to form liquid supply channels and a liquid return channel each of which is isolated one from the other. Each liquid supply channel has a width to depth ratio varying between 6.5 and 15 and a mean hydraulic radius varying between approximately 0.018 and 0.027. The inverted cup shaped member is configured to eliminate shadow areas in order to permit solar radiation to pass therethrough and impinge upon said solar heat absorbing member for all angles of solar radiation impingement from a direction normal to the upper surface of said solar heat absorbing member plus or minus less than 90°. The solar heating panel member may also include an additional layer of transparent material disposed in spaced apart relation to the upper surface of said inverted cup shaped member and the upper surface of said rigid solar heat absorbing member and spaced apart from same.

The method of this invention for heating a liquid comprises forming one or more obstruction free, longitudinally extending liquid passageways one side of each of which is formed from a metallic material wherein the outer surface of said metallic material contains a black, solar radiation heat absorbing coating and each passageway having a width to depth ratio varying between approximately 6.5 to 15.0 and a mean hydraulic radius varying between approximately 0.018 to 0.027, exposing the black, solar radiation heat absorbing coating of said metallic material to solar radiation energy, and heating a liquid by passing same through said passageways and simultaneously maintaining a substantially constant cross-sectional area flow path through said passageways. By such means, the said liquid is accelerated as same flows from one end of said passageway to the other end thereby reducing or eliminating the formation of eddy currents or "dead" liquid pockets which reduce the quantity of fluid that can flow therethrough as well as adversely affecting the efficiency of heat transfer to the liquid flowing therethrough.

A primary object of this invention is to provide a new, novel and more efficient method and solar heating panel for transferring heat to and from a liquid flowing through said path and utilizing solar radiation energy to heat said liquid.

Another object of this invention is to provide a method and panel as aforedescribed which are greatly improved in efficiency of operation.

Another object of this invention is to provide a method and panel as aforedescribed in which each liquid supply channel has a width to depth ratio varying between approximately 9 and 13.5.

Another object of this invention is to provide a method and panel as aforedescribed in which each liquid supply channel has a width to depth ratio equal to approximately 10.

Another object of this invention is to provide a method and panel as aforedescribed in which each liquid supply channel has a mean hydraulic radius varying between approximately 0.018 and 0.023.

Another object of this invention is to provide a method and panel as aforedescribed in which each liquid supply channel has a mean hydraulic radius equal to approximately 0.023.

Another object of this invention is to provide a solar heating panel as aforedescribed in which the liquid impervious upper surface is formed from a metal.

Another object of this invention is to provide a solar heating panel as aforedescribed in which the liquid impervious upper surface is formed from a rubber material.

Another object of this invention is to provide a solar heating panel as aforedescribed in which the upper surface of said inverted cup shaped member comprises a segment of a generally spherically shaped surface having a chord to radius ratio of not more than approximately 0.19.

Another object of this invention is to provide a solar heating panel as aforedescribed in which each strip is configured to support said solar heat absorbing member in spaced apart relation above a major portion of the plan surface area of said strip.

Another object of this invention is to provide a solar heating panel as aforedescribed in which each strip, as configured, supports said heat absorbing member above approximately 85% of the plan surface thereof by a distance equal to approximately 20% of the depth of the fluid supply recess of said panel.

Another object of this invention is to provide a method for heating a liquid as aforedescribed in which the step of heating a liquid includes maintaining a substantially non-turbulent flow of said liquid through said passageway.

Other objects and features of this invention will become apparent by reference to the following specification and to the drawings.

IN THE DRAWINGS

FIG. 1 is a perspective view of a solar heating panel constructed in accordance with the subject invention;

FIG. 2 is an exploded view of the solar heating panel shown in FIG. 1;

FIG. 3 is a cross-sectional view taken along line 3—3 of FIG. 4;

FIG. 4 is a plan view, partially broken away, of two interconnected solar heating panels constructed in accordance with this invention;

FIG. 5 is a cross-sectional view taken along line 5—5 of FIG. 4;

FIG. 6 is a cross-sectional view taken along line 6—6 of FIG. 4;

FIG. 7 is an enlarged, fragmentary, cross-sectional view of a modified embodiment of the panel shown in FIG. 2 taken transversely of the solar heating panel;

FIG. 8 is an enlarged, fragmentary, cross-sectional view of an additional embodiment of the panel shown in FIG. 2 taken transversely of the solar heating panel;

FIG. 9 is an enlarged, fragmentary, cross-sectional view showing the configuration of the currently preferred embodiment of a strip useful in this invention; and FIG. 10 is an enlarged, fragmentary, cross-sectional view showing another embodiment of a configuration of a strip useful in this invention.

DESCRIPTION OF THE PREFERRED EMBODIMENT

The method and solar heating panel of this invention is especially adapted to heat an enclosure, such as a house or the like, by extracting heat energy from a liquid that has been heated by solar radiation. The solar heating panels of this invention are considerably less expensive than prior art heating panels, have a relatively long operating life and are of increased efficiency in operation.

Referring now to the drawings, a solar heating panel 14 is shown comprising a base member 16, a solar heat absorbing member 18, an inverted cup shaped member 20 and an elastic adhesive means 22 (see panel 14' of FIG. 7).

The base member 16 is preferably formed as a composite member. The base member 16 is formed to provide a liquid impervious upper surface 24. The base member may be formed by vacuum forming an outer skin from a plastic material, such as an acrylic, for the base member 16. It is believed that the outer skin may also be formed from a polycarbonate. Said outer skin will be liquid impervious. The outer skin, as formed, will then be filled with an insulating material (such as a urea formaldehyde); however, the composite base member will exhibit good insulative properties thereby minimizing loss of heat therethrough. A plurality of laterally spaced apart fluid supply recesses 26, see FIGS. 2 and 4, are formed in the liquid impervious upper surface 24 and extend longitudinally of said base member 16. An inlet manifold 28 and an outlet manifold 30 are also formed in the liquid impervious upper surface 24 of said base member 16. Each manifold 28 and 30 extend transversely across one of the respective ends of said base member 16 and, also, is disposed in fluid communication with each of said fluid supply recesses 26. The base member 16 also includes an inlet port 32 disposed in fluid communication with the inlet manifold 28 and an outlet port 34 disposed in fluid communication with the outlet manifold 30. The base member 16 preferably includes a fluid return recess formed in the liquid impervious upper surface 24 of said base member along one side thereof, the right hand side as viewed in FIG. 4. The fluid return recess 36 is adapted to be placed in fluid communication with an outlet port 34 such as through the use of a hollow tubular member 38. A plurality of spaced apart strips 40 are formed on the liquid impervious surface 24 of said base member 16. The planar strips 40 are disposed intermediate each of the recesses 26 and 36 and adjacent the outer side of the outwardly disposed recesses 26 and 36.

The solar heat absorbing member 18 is formed from metal having good heat conducting characteristics such as aluminum. It has been found that the upper surface of the member 18 should be maintained generally planar in order to obtain an efficient operation of the panel 14. Thus, the member 18 is rigidly formed to resist bowing thereof as a result of thermal expansion or contraction of the upper surface 24 relative to the thermal expansion or contraction of the member 18. The upper surface of the member 18 contains a black, solar radiation absorbing coating 42 thereon. Preferably, the coating 42 comprises a special layer of spectrally absorbent black paint. The solar heat absorbing member 18 securely bonded to the liquid impervious surface 24 of the base member 16 by an elastic adhesive means 22. As bonded, the solar heat absorbing member cooperates with the recesses 26 and 36 formed in the liquid impervious upper surface surface 24 to form a plurality of liquid supply channels 44 and a liquid return channel 46, see FIGS. 3 and 7. This construction isolates each of the channels 44 and 46 one from the other.

The inverted cup shaped member 20 is formed from a transparent material such as glass or plastic. The material selected must be resistant to weathering, ultraviolet radiation, breakage, cracking and pitting which might otherwise result from hail or wind storms. The upper surface 48 of said member 20 is of a slight "dome" configuration, i.e., it is the segment of a generally spherically shaped surface having a chord to radius ratio of not more than approximately 0.19. It has been found that the upper surface 48 of said member 20 has, when viewed in cross-section, a generally convex surface having a radius of curvature of approximately 3.65 meters (135 inches). Such a configuration provides good strength characteristics for member 20 to resist forces due to thermal expansion and contraction and, also, to enable automatic drainage of moisture from the upper surface thereof. The upper surface 48 is disposed in spaced apart relation to the coating 42 of said member 18. It has been found that good results are obtained from a panel 14 of this invention where the upper surface 48 of member 20 is maintained approximately 4.4 cm (1¾ inches) above the coating 42 formed on member 18. As shown in FIG. 7 an additional layer 50 of transparent material may also be disposed in spaced apart relation to both the upper surface 48 and the coating 42. The layer 50 is spaced from the layer 48 by a distance of approximately 2.54 cm (1 inch). The transparent member 20 permits the solar radiation energy to pass therethrough and impinge upon the coating 42 of the member 18. At the same time, said member 20 particularly the upper surface 48, effectively precludes reflection of long wave solar radiation waves (i.e., longer than approximately 3 microns) outwardly through the upper surface 48. The use of the additional layer 50 formed from transparent material further reduces the reflection of solar radiation waves (particularly the longer length waves) from the coating 42 of member 18 outwardly of the member 20. It will be noted that the use of the inverted cup shaped member 20 as described above and shown in the drawings enables solar radiation waves to pass therethrough and impinge upon the coating 42 of the solar heat absorbing member 18 for all angles of solar radiation impingement from a direction normal to the upper surface of the member 18 plus or minus slightly less than 90°. More specifically, solar radiation waves will impinge upon the coating 18 for all angles of solar radiation impingement from a direction normal to the upper surface of the member 18 down to, but not including, 90°, i.e., waves which are directed slightly less than tangential to the coating 42. This means that solar radiation waves will impinge upon the coating 42 for the longest period of time possible for any proper orientation of the panel 14 relative to the force of solar radiation waves.

In order to obtain solar radiation impingement across the entire surface of the coating 42 of member 18 for the longest period of time possible as referred to above, the upper surface of the member 18 must be maintained generally planar. More specifically, if the upper surface of the member 18 bowed in either direction, there will be reduction in the amount of time that solar radiation waves may impinge thereon. It has been found that the upper surface of the member 18 may be maintained generally planar by using an elastic adhesive means having flat bonding characteristics over the environmental temperature range to be encountered during use of the panel 14. For example, the elastic adhesive means 22 must not become embrittled at low temperatures, i.e., down to approximately −29° C. to −34° C. (−20° to −30° F.), nor become unnecessarily soft at high temperatures, i.e., up to approximately 176° C. (350° F.). Moreover, the bonding characteristics must remain essentially unchanged over this environmental temperature range. Finally, the adhesive means must stretch or deform when subjected to a force resulting from the unequal expansion of the members 16 and 18 and yet return to its former configuration when such force has been eliminated upon a change in thermal conditions which produced such unequal expansion. The use of silicone adhesive such as G. E. silicone RTV-630, manufactured by General Electric Company, has been found to be suitable for this application.

An important feature of this invention it to utilize liquid supply channels which enable the transfer of heat energy from the member 18 to the individual molecules of liquid in order to raise the temperature of the liquid to a desired level while same is flowing through said channels. It has been unexpectedly found that same may be accomplished through the use of fluid supply channels or passageways which are generally rectangular in cross-section and have a width to depth ratio varying between approximately 6 and 15 and a mean hydraulic radius varying between approximately 0.018 and 0.027. The mean hydraulic radius is defined as the cross-sectional area of the fluid supply channel or passageway divided by the wetted perimeter thereof. Preferably, the width to depth ratio of each liquid supply channel or passageway should vary between approximately 9 and 13.5 and excellent results have been obtained where the width to depth ratio equals approximately 10. Preferably, the mean hydraulic radius of each liquid supply channel should vary between approximately 0.018 and 0.023 and excellent results have been obtained where the mean hydraulic radius is equal to approximately 0.023.

The solar heating panels of this invention are preferably installed on the upper surface of a roof in a manner to permit impingement of solar radiation waves on the coating 42. For existing structures, the solar heating panels may be installed on the upper surface of the roof of said structure. For newly built structures, the solar heating panel of this invention may be formed as an integral part of the roof. The flow of liquid through solar heating panels mounted on a roof as aforedescribed is against the force of gravity, i.e., upwardly from the lower most portion of a solar heating panel to the upper most portion thereof. In this manner, it is possible to maintain the liquid supply channels and the liquid return channel completely full of liquid and thereby eliminate the presence of air and gas bubbles to obtain a high degree of efficiency in operation of said panels.

Understandably, the performance of a solar heating panel will depend upon a number of factors such as the ambient temperature, the presence or absence of clouds, particulate matter, water vapor and the like in the atmosphere which would interfere with the transmission of solar radiation waves therethrough, the angle of impingement of the solar radiation waves upon the coating 42 of the solar heat absorbing member 18 and the amount and efficiency of insulation used. The efficiency of the panel, on the other hand, depends upon a number of other factors such as its geometry, fluid contact to absorber surface ratio, flow rate and minimization or elimination of "dead" liquid pockets associated with the sides of the liquid flow channels. Applicants understand, however, that the amount of heat energy thought to be available at a position above the atmosphere under ideal conditions is 119.8 calories per square centimeter per hour (442 BTU per hour per square foot) which is sometimes referred to as the "Solar Constant." Applicants have been able to extract slightly more than 78.6 calories per square centimeter per hour (290 BTU per hour per square foot) under as ideal conditions as was achieved in May, 1974, at Denver, Colorado, but below the atmosphere. It will be understood, however, that reduced performance for a solar heating panel constructed in accordance with this invention resulted where less than ideal conditions were encountered, i.e., a cloudy sky, different impingement angle and the like. Nevertheless, applicants are not aware of any other solar heating panel capable of operating with the degree of efficiency as has been achieved with the solar heating panel of this invention.

It will be noted that FIG. 7 shows a solar heating panel 14' similar to the solar heating panel of FIG. 2 except for the addition of the additional layer 50 of transparent material disposed intermediate the upper surface 48 of base member 20 and the upper surface of the solar heat absorbing member 18.

In FIG. 8 is shown another embodiment of a solar heating panel 14''. The solar heating panel 14'' is similar to the solar heating panel 14 of FIG. 3 except that the liquid impervious upper surface 24' is formed from a layer of a suitable material such as metal or rubber. The layer 24' of material is secured to the base member 16' by an elastic adhesive means 22 as already described above.

In FIG. 9 is shown the currently preferred embodiment of a strip 40' to be incorporated in a panel constructed in accordance with this invention. More specifically, the strip 40' as shown in FIG. 9 is, in cross-section, generally of an inverted V-shaped configuration. The elastic adhesive means 22 is disposed intermediate the lower surface of the solar heat absorbing member 18 and a major portion (and preferably 85% or more) of the plan surface area of said strip 40'. The distance separating the lower surface of member 18 and the side 52 of each strip 40' is equal to approximately 20% of the depth of the fluid supply recesses formed in the liquid impervious upper surface 24''.

In FIG. 10 is shown another embodiment of a strip 40'' configured for incorporation within a solar panel constructed in accordance with this invention. The strip 40'' contains boss means 54 for supporting the lower surface of member 18 in spaced apart relation above a major portion (preferably 85% or more) of the plan surface area of strip 40''. The distance separating the lower surface of member 18 and a major portion of the upper surface of strip 40'' is equal to approximately 20% of the depth of the fluid supply recesses formed in the liquid impervious upper surface 24'''.

As shown in FIGS. 2-4, the fluid return recess 36 is preferably formed in the liquid impervious upper surface 24. Formation of the fluid return recess 36 in said liquid impervious upper surface has been found to be additionally beneficial in improving the overall efficiency of a solar heating panel constructed in accordance with this invention since the liquid does not lose any heat in flowing therethrough; rather, a slight increase in heat of the liquid normally occurs. It will be understood, however, that the fluid return recess is constructed of a sufficient size to permit the return of the entire quantity of liquid flowing through the plurality of fluid supply channels formed in the solar heating panel 14. It will also be understood that the fluid return channel is not constructed to have the width to depth ratios or the mean hydraulic radius as described above with respect to the fluid supply channels. Finally, it will be appreciated that the fluid return channel may comprise a separate liquid conveyance means (not shown) formed outside of the solar heating panel 14. For example, tubular member 38, see FIG. 4, may extend longitudinally of the solar heating panel 14 back to a reservoir (not shown) of heated liquid. Additionally, the upper most panel of one or more series connected panels may be constructed in such a way that the liquid flow passage represented by tubular member 38 may be formed within the panel itself to provide fluid communication directly between the outlet manifold 30 and the liquid return channel 36.

Illustrative dimensions of a solar heating panel constructed in accordance with this invention are as follows:

Width of panel - 22 inches (56 cm.)
Length of panel - 4 feet (122 cm.)
Number of liquid supply channels - 19
Width of each liquid supply channel - 0.5 inches (1.3 cm.)
Depth of each liquid supply channel - 0.05 inches (0.127 cm.)
Width to depth ratio of each liquid supply channel - 10
Mean hydraulic radius of each liquid supply channel - 0.023
Flow through 19 liquid supply channels - 1 gallon per minute (3.8 liters per minute)
Reynolds number - 1708.
Solar heat absorbing member - aluminum alloy 47 inches × 22 5/8 inches × 0.032 inches (119.4 cm. × 57.5 cm. × 0.081 cm.)

The method of this invention enables the efficient heating of a liquid through the utilization of solar radiation energy. The method of this invention comprises forming an obstruction free, longitudinally extending liquid channel or passageway one side of which is formed from a metallic material having good heat conducting characteristics, such as aluminum. The outer surface of the metallic material contains a black, solar radiation heat absorbing coating thereon. The coating is essentially nonreflective and, thus, is highly efficient in absorbing heat energy from solar radiation. Each liquid passageway is formed with a width to depth ratio varying between approximately 6.5 and 15.0. Each liquid passageway also has a mean hydraulic radius varying between approximately 0.018 and 0.027. Liquid passageways which are rectangular in cross-section and being formed from 0.4 inches (1.02 cm.) to 0.6 inches (1.52 cm.) wide and 0.04 inches (0.102 cm.) to 0.05 inches (0.127 cm.) deep meet the aforementioned criteria. The black, solar radiation heat absorbing coating 42 of the metallic material is exposed to solar radiation energy. The liquid is heated by passing same through said liquid passageways and simultaneously maintaining a substantially constant cross-sectional area flow path therethrough by accelerating said liquid as same flows from one end of said passageway to the other. The acceleration is achieved as a result of the slight thermal expansion of the liquid as same flows through the liquid passageways. This thermal expansion maintains a substantially constant cross-sectional flow path through said passageways by maintaining to a minimum the "dead" liquid pockets associated with the sides of the liquid passageways. It has been found that good heat transfer through the metallic material to the liquid is achieved by maintaining a substantially non-turbulent or laminar flow through the liquid passageways. It has also been found that heat energy is transferred into the liquid from that portion of the solar heat absorbing member that is in contact with or disposed above the strips 40 that extend along either side of each liquid fluid supply channel.

In view of all the foregoing, it will be readily appreciated that a new and novel method of heating a liquid through the utilization of solar radiation waves and a solar heating panel therefor has been described. The solar heating panel may be constructed from readily available materials which are relatively inexpensive. Additionally, the solar heating panel is relatively inexpensive to construct. Moreover, it has a long operating life and achieves an unusually high efficiency in operation as compared to known prior art devices. The solar heating panel of this invention may be used either on top of existing roofs or to form a part of a roof of a new structure. The solar heating panel of this invention permits the efficient utilization of the sun's energy thereby resulting in a saving of other forms of energy. In certain areas of the world, the solar heating panel of this invention may be utilized for a substantial portion of the heating requirements of an enclosed structure thereby permitting operations to take place in areas of the world heretofore considered generally unsuitable due to the cost of obtaining and supplying energy to heat same.

Although specific forms of the invention are disclosed to illustrate the underlying principles, it being understood that the embodiment of the panel 14 shown in FIGS. 2–4 is currently considered the preferred embodiment of a solar heating panel constructed in accordance with this invention while the strip configuration 40' shown in FIG. 9 is currently preferred, it will be appreciated that modifications may be made which fall within the spirit of this invention.

We claim:
1. A solar heating panel comprising:
 a. a base member formed from an insulating material, said member having
  i. a liquid impervious upper surface,
  ii. a plurality of spaced apart fluid supply recesses formed in said upper surface and extending longitudinally therealong,
  iii. inlet and outlet manifolds, each manifold extending transversely across one of the ends of said base member and each manifold being disposed in fluid communication with each of said recesses,
  iv. an inlet port disposed in fluid communication with said inlet manifold,
  v. an outlet port disposed in fluid communication with said outlet manifold,
  vi. a fluid return recess formed in the upper surface of said base member along one side thereof, said fluid return recess being adapted to be placed in fluid communication with said outlet port, and
  vii. a plurality of spaced apart strips formed on the upper surface of said base member, said strips being disposed intermediate each of said recesses and adjacent the outer side of the outwardly disposed recesses;
 b. a rigid solar heat absorbing member formed from metal and mounted upon the upper surface of said base member in contacting engagement with each of said strips,
  i. the upper surface of said solar heat absorbing member containing a black, solar radiation absorbing coating thereon,
  ii. said solar heat absorbing member cooperating with said recesses to form liquid supply channels and a liquid return channel each of which is isolated one from the other,
  iii. each liquid supply channel having a width to depth ratio varying between approximately 9 and 13.5, and
  iv. each liquid supply channel having a mean hydraulic radius varying between approximately 0.018 and 0.023;
 c. an inverted cup shaped member formed from a transparent material and secured to said base member, said cup shaped member having an upper, generally planar surface spaced apart from the upper surface of said solar heat absorbing member, said inverted cup shaped member permitting solar radiation to pass therethrough and impinge upon said solar heat absorbing member for all angles of solar radiation impingement from a direction normal to the upper surface of said solar heat absorbing member plus or minus less than 90 degrees; and
 d. an elastic adhesive means for securing said solar heat absorbing member to said strips, said adhesive means having flat bonding characteristics over the environmental temperature range whereby thermal expansion of said base member relative to thermal expansion of said solar heat absorbing member occurs while maintaining a general planarity of the upper surface of said solar heat absorbing member.

2. A solar heating panel as described in claim 1 in which the width to depth ratio of each liquid supply channel is equal to approximately 10.

3. A solar heating panel as described in claim 1 in which the mean hydraulic radius of each liquid supply channel is equal to approximately 0.023.

4. A solar heating panel as described in claim 1 including a layer of transparent material disposed intermediate said upper surface of said inverted cup member and said upper surface of said solar heat absorbing member and spaced apart therefrom.

5. A solar heating panel as described in claim 1 in which the upper surface of said inverted cup shaped member comprises a segment of a generally spherically shaped surface having a chord to radius ratio of not more than approximately 0.19.

6. A solar heating panel as described in claim 1 in which each strip includes means for supporting said solar heat absorbing member in spaced apart relation above a major portion of the plan surface area of each said strip.

7. A solar heating panel as described in claim 6 in which each strip is, in cross-section, generally of an inverted V-shaped configuration.

8. A solar heating panel as described in claim 6 in which each strip includes boss means formed thereon for supporting said solar heat absorbing member in spaced apart relation above approximately 85% of the plan surface area of each said strip by an amount equal to approximately 20% of the depth of said fluid supply recesses.

9. A solar heating panel comprising:
 a. a base member formed from an insulating material, said member having
  i. a liquid impervious upper surface,
  ii. a plurality of spaced apart fluid supply recesses formed in said upper surface and extending longitudinally therealong,
  iii. inlet and outlet manifolds, each manifold extending transversely across one of the ends of said base member and each manifold being disposed in fluid communication with each of said recesses,
  iv. an inlet port disposed in fluid communication with said inlet manifold,
  v. an outlet port disposed in fluid communication with said outlet manifold, and
  vi. a plurality of spaced apart strips formed on the upper surface of said base member, said strips being disposed intermediate each of said recesses and adjacent the outer side of the outwardly disposed recesses;
 b. a rigid solar heat absorbing member formed from metal and mounted upon the upper surface of said base member in contacting engagement with each of said strips,
  i. the upper surface of said solar heat absorbing member containing a black, solar radiation absorbing coating thereon,
  ii. said solar heating absorbing member cooperating with said recesses to form liquid supply channels each of which is isolated one from the other,
  iii. each liquid supply channel having a width to depth ratio varying between approximately 6.5 to 15.0, and
  iv. each liquid supply channel having a mean hydraulic radius varying between approximately 0.018 and 0.027;
 c. an inverted cup shaped member formed from a transparent material and secured to said base member, said cup shaped member having an upper generally planar surface spaced apart from the upper surface of said solar heat absorbing member, said inverted cup shaped member permitting solar radiation to pass therethrough and impinge upon said solar heat absorbing member for all angles of solar radiation impingement from a direction normal to the upper surface of said solar heat absorbing member plus or minus less than 90°;
 d. an elastic adhesive means for securing said solar heat absorbing member to said strips, said adhesive means having flat bonding characteristics over the environmental temperature range whereby thermal expansion of said base member relative to thermal expansion of said solar heat absorbing member occurs while maintaining a generally planarity of the upper surface of said solar heat absorbing member; and
 e. said base member including a fluid return recess formed in the upper surface along one side thereof, said fluid return recess being adapted to be placed in fluid communication with said outlet port, and said solar heat absorbing member cooperating with said fluid return recess to form a liquid return channel that is isolated from the liquid supply channels.

10. A solar heating panel comprising:
 a. a base member having
  i. a liquid impervious upper surface,
  ii. a plurality of spaced apart fluid supply recesses formed in said upper surface and extending longitudinally therealong,
  iii. inlet and outlet manifolds, each manifold extending transversely across one of the ends of said base member and each manifold being disposed in fluid communication with each of said recesses,
  iv. an inlet port disposed in fluid communication with said inlet manifold,
  v. an outlet port disposed in fluid communication with said outlet manifold,
  vi. a fluid return along a portion of the base member, said fluid return being adapted to be placed in fluid communication with said outlet port,
  vii. a plurality of spaced apart strips formed on the upper surface of said base member, said strips being disposed intermediate each of said recesses and adjacent the outer side of the outwardly disposed recesses,
  viii. each strip including, in cross-section, means integral therewith for supporting said solar heat absorbing member in spaced apart relation above approximately 85% of the plan surface area of each said strip by an amount equal to approximately 20% of the depth of said fluid supply recesses;
 b. a rigid solar heat absorbing member formed from metal and mounted upon the upper surface of said base member in contacting engagement with each of said strips,
  i. the upper surface of said solar heat absorbing member containing a solar radiation absorbing coating thereon,
  ii. said solar heat absorbing member cooperating with said recesses to form liquid supply channels each of which is isolated one from the other;
 c. a cover member formed from a transparent material and secured to said base member, said cover member having an upper, generally planar surface spaced apart from the upper surface of said solar heat absorbing member, said cover member permitting solar radiation to pass therethrough and impinge upon said solar heat absorbing member for all angles of solar radiation impingement from a direction normal to the upper surface of said solar heat absorbing member plus or minus less than 90 degrees; and
 d. an adhesive means for securing said solar heat absorbing member to said strips, said adhesive means having flat bonding characteristics over the environmental temperature range whereby thermal expansion of said base member relative to thermal expansion of said solar heat absorbing member occurs while maintaining a general planarity of the upper surface of said solar heat absorbing member.

11. A solar heating panel as described in claim 10 in which each strip is, in cross-section, generally of an inverted V-shaped configuration.

12. A solar heating panel as described in claim 10 in which the width to depth ratio of each liquid supply channel varies between approximately 6.5 to 15.0.

13. A solar heating panel as described in claim 10 in which each liquid supply channel has a mean hydraulic radius varying between approximately 0.018 and 0.027.

14. A solar heating panel comprising:
a. a base member having
   i. a liquid impervious upper surface,
   ii. a plurality of spaced apart fluid supply recesses formed in said upper surface and extending longitudinally therealong,
   iii. inlet and outlet manifolds, each manifold extending transversely across one of the ends of said base member and each manifold being disposed in fluid communication with each of said recesses,
   iv. an inlet port disposed in fluid communication with said inlet manifold,
   v. an outlet port disposed in fluid communication with said outlet manifold,
   vi. a fluid return recess formed in the upper surface of said base member along one side thereof, said fluid return recess being adapted to be placed in fluid communication with said outlet port, and
   vii. a plurality of spaced apart strips formed on the upper surface of said base member, said strips being disposed intermediate each of said recesses and adjacent the outer side of the outwardly disposed recesses;
b. a rigid solar heat absorbing member formed from metal and mounted upon the upper surface of said base member in contacting engagement with each of said strips,
   i. the upper surface of said solar heat absorbing member containing a solar radiation absorbing coating thereon,
   ii. said solar heat absorbing member cooperating with said recesses to form liquid supply channels and a liquid return channel each of which is isolated one from the other;
c. a cover member formed from a transparent material and secured to said base member, said cover member having an upper, generally planar surface spaced apart from the upper surface of said solar heat absorbing member, said cover member permitting solar radiation to pass therethrough and impinge upon said solar heat absorbing member for all angles of solar radiation impingement from a direction normal to the upper surface of said solar heat absorbing member plus or minus less than 90 degrees; and
d. an adhesive means for securing said solar heat absorbing member to said strips, said adhesive means having flat bonding characteristics over the environmental temperature range whereby thermal expansion of said base member relative to thermal expansion of said solar heat absorbing member occurs while maintaining a general planarity of the upper surface of said solar heat absorbing member.

* * * * *